(12) United States Patent
Ault

(10) Patent No.: US 6,350,484 B1
(45) Date of Patent: Feb. 26, 2002

(54) LIQUID BEVERAGE CONCENTRATE

(75) Inventor: Frederick Keith Ault, Indianapolis, IN (US)

(73) Assignee: VitaChlor Corporation, Indianapolis, IN (US)

( * ) Notice: Subject to any disclaimer, the term of this patent is extended or adjusted under 35 U.S.C. 154(b) by 0 days.

(21) Appl. No.: 09/428,218

(22) Filed: Oct. 27, 1999

(51) Int. Cl.[7] ................... A23L 1/05; A23L 1/053; A23L 1/48
(52) U.S. Cl. ............ 426/590; 426/573; 426/658
(58) Field of Search ................ 426/590, 573, 426/658

(56) References Cited

U.S. PATENT DOCUMENTS 4,199,605 A * 4/1980 Kahn et al. ................. 426/613
5,817,351 A * 10/1998 DeWille et al. ............. 426/573
6,071,547 A *  6/2000 Schechter ................... 426/590

* cited by examiner

*Primary Examiner*—Helen Pratt
(74) *Attorney, Agent, or Firm*—Woodard, Emhardt, Naughton, Moriarty & McNett

(57) ABSTRACT

A liquid beverage concentrate containing fructose, non-dairy creamer, a combination of xanthan gum and tragacanth gum, flavorings and water. The composition enables relatively high ratios of finished beverage to concentrate while remaining of sufficiently low viscosity to allow the use of conventional beverage pumps and dispensers. The liquid beverage concentrate is also resistant to microbial growth without the need for additional preservatives, thereby enabling storage at ambient temperatures.

11 Claims, No Drawings

LIQUID BEVERAGE CONCENTRATE

FIELD OF THE INVENTION

This invention relates to a liquid beverage concentrate and to finished beverages made therefrom. More particularly, this invention relates to formulations of liquid beverage concentrates that allow for highly concentrated, easily mixed formulations having extended shelf lives and that provide finished beverages with excellent taste and mouth feel.

BACKGROUND OF THE INVENTION

The beverage industry currently uses a number of product formats to deliver various beverages to the consumer in a convenient manner, including ready to consume liquids, dry mixes and liquid concentrates. Shipping and storage costs of bulky, ready to consume products are relatively high, and refrigeration may be required to increase shelf life. This is particularly true for packaging, shipping and storing single serve bottles, cans, bags or boxes.

Liquid concentrates in bulk packaging may be mixed with water and rapidly chilled or heated by dispenser systems at the point of consumption. The higher concentrations reduce shipping bulk and cost by eliminating shipment of water, which is easily obtained at the final mixing location. Packaging costs are also reduced. Liquid concentrates may still require special storage conditions, particularly after being opened. Furthermore, concentrates may be of a lower quality compared to ready to consume products due to poor taste or mouth feel from improper mixing/dilution of the concentrate. There is also a practical limit on the degree of concentration obtainable for liquid beverage mixes, in that the water content must remain high enough to provide a flowable product that is readily pumped and mixed to obtain the desired final product. Furthermore, a product that is too viscous or that is not readily miscible will require longer mixing times and/or more agitation to properly prepare the final product from the concentrate.

Dry mixes or powdered/crystalline formulations often provide the optimum in transportation and storage in that dry goods tend to be more easily handled, do not contain water weight, and tend to be less susceptible to spoilage. However, use of dry mixes is particularly fraught with difficulties in providing convenient dispensing at the point of use. The mix must be properly rehydrated and then dispensed. Such mixes also frequently provide final products with inferior taste and mouth feel compared to ready to consume products and beverages prepared from concentrates. It is frequently difficult to obtain complete dissolution of powder or crystalline mixes in a convenient manner.

Of particular interest is the rising demand for convenient product forms for delivering cold or "frozen" coffee, cappuccino and cocoa beverages. Flavorings for these beverages tend to be problematic for concentrates due to their low solubility/poor suspension characteristics and typically require more dilute solutions to achieve acceptable products.

There is, therefore, a need for improved formulations of liquid beverage concentrates that optimize shipping, handling and storage considerations, but remain flowable and highly miscible for ease of pumping, accuracy of dispensing, and ease and speed of mixing to provide final products. There is also a continued need for liquid beverage concentrates that are resistant to spoilage and can be stored under ambient conditions for several months without detriment to the final consumable product.

BRIEF SUMMARY OF THE INVENTION

It is an object of the present invention to provide liquid beverage concentrates that are diluted with three to six volumes of water to prepare the intended final beverage products.

It is also an object of the invention to provide liquid beverage concentrates that are easily diluted with water to provide final beverage products with excellent taste and mouth feel, particularly for concentrates of beverages with coffee, cappuccino, tea, cocoa or chocolate flavorings or mixtures thereof.

It is yet another object of the invention to provide liquid beverage concentrates having sufficiently low viscosity to allow the use of conventional beverage pumps and dispensers.

It is a further object of the present invention to provide liquid beverage concentrates having improved shelf lives under ambient storage conditions without reliance on additional preservatives or sterile packaging techniques.

These and other objects and benefits are achieved by formulating liquid beverage concentrates using a combination of fructose, non-dairy creamer, xanthan gum, tragacanth gum and water, together with desired flavorings and other optional elements commonly found in beverage formulations.

With all concentrations expressed as weight percent of the concentrate, one embodiment of the present inventive liquid beverage concentrate comprises at least 25% fructose, at least 20% non-dairy creamer and between about 0.075 and about 0.3% gum mixture, wherein the gum mixture is a combination of xanthan gum and tragacanth gum.

In a preferred embodiment of the invention, the concentrate comprises about 25–45% fructose, about 20–45% non-dairy creamer and about 0.075–0.3% gum mixture, wherein the gum mixture comprises about 0.02–0.28% each independently of xanthan gum and tragacanth gum.

In another preferred embodiment, the liquid beverage concentrate of the present invention comprises about 30–40%, preferably about 33–38% fructose, about 25–40%, preferably about 28–35% non-dairy creamer, and about 0.075–0.3%, preferably about 0.1–0.2% gum mixture, wherein the gum mixture comprises about 0.02–0.28%, preferably about 0.03–0.27% each independently of xanthan gum and tragacanth gum.

In yet another preferred embodiment, the flavoring of the liquid beverage concentrate of the present invention comprises one or more flavorings selected from the group consisting of coffee, cappuccino, tea, cocoa and chocolate. Each flavoring selected is preferably present at a concentration of about 0.1–3.0%, with a combined total flavoring concentration of about 0.4–8% by weight of the concentrate.

Further objects, embodiments and features of the present invention will be apparent from the following description of the preferred embodiments.

DETAILED DESCRIPTION OF THE INVENTION

For the purpose of promoting an understanding of the principles of the invention, reference will now be made to preferred embodiments and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Liquid beverage concentrates of the present invention are prepared by mixing fructose, non-dairy creamer, xanthan gum and tragacanth gum in water together with flavorings and optionally other common beverage components to provide a flowable concentrate that can be easily diluted to provide liquid beverages with excellent taste and mouth feel. The concentrate formulations of the present invention also allow for enhanced benefits of low cost, convenience, ease of use, preferred packaging and long shelf life. These benefits are achieved as a result of the novel combination of the above mentioned elements.

Fructose is used for its greater sweetening strength, weight for weight as compared to sucrose (cane sugar). Fructose is roughly 1.5 times sweeter than sucrose in cold media, which allows finished beverage formulations to comprise 8–10% sweetener, rather than the typical 10–15% sweetener of prior art formulations. The lower solids content of the finished product allows for a greater percent reduction of water content in the concentrate while maintaining a sufficiently low viscosity to enable the use of conventional beverage pumps. In one preferred embodiment, the concentration of fructose and other components is selected so that the viscosity of the concentrate is sufficiently low to enable the use of a standard soda fountain "bag-in-a-box" concentrate mixing format.

Fructose is also selected as a sweetener for its effective reduction of the water vapor pressure. On a per weight basis, fructose reduces the water vapor pressure of solutions roughly two fold more than sucrose. It is known in the food industry that common pathogenic bacteria do not effectively propagate in media with a water activity of less than 0.83. Water activity is a food industry measure of relative water vapor pressure of a solution at a given temperature compared to pure water. It correlates to the amount of water available to support microbial growth or free water. The majority of particularly hazardous bacteria can not effectively propagate in media with water activities less than 0.90. In one preferred embodiment of the present invention the concentrations of fructose and other components are selected to provide concentrates with water activities at room temperature of less than or equal to about 0.83 and more preferably less than or equal to about 0.80.

An additional benefit gained from the use of fructose as compared to sugar or corn syrup is a reduced caloric burden. Since a lower concentration of fructose is required to achieve the same sweetened taste as sucrose, beverages made from the present inventive concentrates have approximately two thirds the calories attributable to the sweetener as compared to beverages sweetened with cane sugar (sucrose) or corn syrup (glucose and maltose).

In one embodiment of the present invention, the concentrate contains at least 25% by weight fructose. In a preferred embodiment, the concentrate contains between about 25% and about 45% by weight fructose. In yet another embodiment, fructose is present at between about 30% and about 40%, preferably between about 33% and about 38% by weight of the concentrate. The lower limit of fructose in the concentrate is dictated by the desired concentration of sweetener in the final beverage product and the degree of concentration desired to benefit from the reduced bulk in shipping and storing and the increased resistance to microbial growth desired. The upper limit of fructose concentration is limited by the need to maintain a sufficiently low viscosity when in formulation with the other components of the concentrate, to enable efficient pumping, measuring, and mixing of the concentrate.

Gums are commonly used to enhance suspension or dissolution of flavorings and other components of food and beverage products, as well as to add a sense of substance to the mouth feel of the final product. By way of example and not as a limitation, cocoa is difficult to suspend in aqueous media and particularly so when a non-dairy creamer is also present. Xanthan gum may be used to achieve adequate suspension of cocoa. However, use of xanthan gum alone results in a "slimy" mouth feel. Furthermore, xanthan gum alone, at concentrations effective for suspension of flavorings for preparation of a three-fold or greater addition of water, results in a composition too viscous to pump with standard beverage equipment.

It has now been discovered that the combination of tragacanth gum with xanthan gum results in a beverage concentrate with excellent suspension of flavorings and other components, while maintaining viscosities sufficiently low to allow efficient pumping with conventional beverage equipment. These benefits are achieved even at concentrations useful for combination with between about 3 and about 6 volumes of water to produce the finished beverage. This combination also results in finished beverages with excellent mouth feel.

In one preferred embodiment of the present invention, the beverage concentrate contains a combination of xanthan gum and tragacanth gum at a combined concentration of between about 0.075% and about 0.3% by weight of the concentrate. In another embodiment, the combined concentration of xanthan gum and tragacanth gum is between about 0.1% and 0.2% by weight of the concentrate. In one embodiment, the concentrate contains xanthan gum at between about 0.02% and about 0.28% by weight of the concentrate and tragacanth gum at between about 0.02% and about 0.28% by weight of the concentrate. In another preferred embodiment, the concentrate contains xanthan gun at between about 0.03% and about 0.27% by weight of the concentrate and tragacanth gum at between about 0.03% and about 0.27%. In another preferred embodiment, xanthan gum and tragacanth gum are combined in the concentrate at a ratio of between about 1:1 and about 2:1, xanthan gum to tragacanth gum.

It has also been discovered in the present invention that the combination of xanthan and tragacanth gums is very effective in reducing the water vapor pressure of the concentrate. This works in combination with the fructose to reduce the water activity of the concentrate, which enhances the concentrate's resistance to microbial growth.

The non-dairy creamer can be any non-dairy creamer conventionally used in the beverage industry. Illustrative examples include, without limitation, Cremora by Borden; Jerzee Vend C and Jerzee DMAF by Diehl; and Sana-A-Crème V by Kerry. In one embodiment of the present invention, the beverage concentrate contains at least 20% non-dairy creamer by weight of the concentrate. In one preferred embodiment, the non-dairy creamer is present at a concentration of between about 20% and about 45%, more preferably between about 25% and about 40%, and most preferably between about 28% and about 35% by weight of the concentrate. The combination of the non-dairy creamer with the xanthan/tragacanth gum mixture in the specified ranges provides finished beverage products with a delightful, creamy mouth feel. The non-dairy creamer also works in concert with the gums and fructose to reduce the water activity of the concentrate. A practical upper limit to the concentration of non-dairy creamer is where the combination of creamer with other components produces a liquid with a viscosity too high to be pumped, measured or mixed efficiently, or a finished beverage product with a mouth feel that is too thick or chalky.

Any conventional flavorings are suitable for use in the present invention. Flavorings can be used individually or in combination. Preferred flavoring concentrations are between about 0.1% and about 3.0% by weight of concentrate for each flavoring independently, with a preferred combined total flavoring concentration of between about 0.4% and about 8%, more preferably between about 2.5% and about 6.0%.

Preferred flavorings for use in the present invention are coffee, cappuccino, tea, cocoa and chocolate. Producing adequate liquid beverage concentrates with these flavorings have been problematic in the prior art as compared to other typical liquid beverages, including typical carbonated soft drinks. Coffee, cappuccino, cocoa and chocolate have relatively poor solubility in water. Solubility problems are increased when significant concentrations of creamer are also present, as is preferred with these flavorings to provide beverages with satisfying taste and mouth feel. Solubility problems with these flavorings are further augmented for cold liquid beverages such as iced coffees, cappuccinos and mochas. The novel combination of fructose, xanthan gum, tragacanth gum and non-dairy creamer with these flavorings according to the present invention solves these solubility problems to provide easily mixed, excellent tasting hot or cold beverages with coffee, cappuccino, cocoa and/or chocolate flavorings having excellent taste and mouth feel.

It is to be understood that other components commonly used in the formulation of beverages and beverage concentrates may optionally be used in concentrates of the present invention. By way of example, but without limitation, other optional ingredients may include malic acid as an acidulant, preservatives such as potassium sorbate to enhance shelf-life of the diluted, finished product, food colorings, and calcium phosphate, potassium citrate and salt for acid buffering and flavor enhancement. The upper limitations on such additional components are dependent on their effect on taste, mouth feel and viscosity. It is preferred that the overall viscosity remain sufficiently low to enable the use of conventional beverage pumps and dispensers and that these additional additives do not adversely affect the taste and mouth feel of the final beverage product.

The concentrates of the present invention may be provided in a number of product packaging formats. By way of example, but without limitation, suitable packaging includes plastic, foil, or multi-layered pouches or bags in a variety of sizes ranging from several fluid ounces to several gallons for use with automatic filling equipment, lined boxes, glass or plastic jugs, drums, bottles, and canisters. One preferred packaging format is the "bag-in-a-box" packaging used in automated soda fountain mixing machines.

To provide a ready to serve liquid beverage from the liquid beverage concentrate of the present invention, the concentrate is mixed with water or carbonated water to obtain a homogeneous dilution of the concentrate. Mixing can be effected by any conventional means known in the beverage industry including, but not limited to conventional soda fountains, "bag-in-a-box" type beverage concentrate mixing and dispensing machines, blenders, soft-serve ice cream machines, and "slush" machines.

In a preferred embodiment, the concentrate is formulated to be used with between about three and about six volumes of water to prepare the final beverage formulation. Lower concentrations are also suitable, but would not benefit as greatly from the reduced bulk of the product and may not have a water activity low enough to provide effective bacteriostatic conditions. The practical upper limit on the concentration is dependent on the viscosity of the concentrate as described above.

While the invention has been described in detail in the foregoing description, the same is to be considered as illustrative and not restrictive in character, it being understood that only the preferred embodiments have been shown and described. The invention will now be further described with reference to the following specific Examples. It will be understood that these Examples are also only illustrative and are intended only to provide further understanding of the compositions and processes of the present invention.

EXAMPLES

Unless specified otherwise, all concentrations are expressed in terms of percent by weight of the concentrate.

Example 1

Mocha flavored liquid beverage; 3:1 concentrate and finished product therefrom.

A concentrate of mocha flavored beverage was prepared by mixing the following components in the stated proportions:

| | |
|---|---|
| Water | 26.625% |
| Non-Dairy Creamer | 32.0% |
| Fructose | 36.0% |
| Cocoa | 1.5% |
| Instant Coffee | 1.5% |
| Xanthan Gum | 0.05% |
| Tragacanth Gum | 0.05% |
| Malic Acid | 0.075% |
| Potassium Sorbate | 0.20% |
| Natural and Artificial Flavors | 1.0% |
| Total | 100.0% |

The concentrate demonstrated a shelf life of greater than twelve months at room temperature and greater than three months at room temperature after being opened for use. No bacterial contamination was detected by standard plate count using trypicase soy agar plates containing lecithin broth. The concentrate was mixed with water at a ratio of three parts water to one part concentrate by pumping through Shurflo™ brixing pumps into a typical slush freezer that freezes and mixes simultaneously to provide a finished liquid beverage product. The finished product was consistently well mixed by the dispenser and had excellent taste and mouth feel. The product produced from the concentrate was not distinguishable from a product of the same final composition formulated directly as a finished product.

Example 2

Mocha flavored liquid beverage; 4:1 water: concentrate in the finished product therefrom.

| | |
|---|---|
| Water | 23.975% |
| Non-Dairy Creamer | 32.0% |
| Fructose | 38.0% |
| Cocoa | 2.0% |
| Instant Coffee | 2.0% |
| Xanthan Gum | 0.075% |
| Tragacanth Gum | 0.075% |
| Malic Acid | 0.075% |

| | |
|---|---:|
| -continued | |
| Potassium Sorbate | 0.30% |
| Natural and Artificial Flavors | 1.5% |
| Total | 100.0% |

The concentrate was mixed with water at a ratio of four parts water to one part concentrate by pumping through Shurflo™ brixing pumps into a typical slush freezer that freezes and mixes simultaneously to provide a finished liquid beverage product. The finished product was consistently well mixed by the dispenser and had excellent taste and mouth feel. The product produced from the concentrate was not distinguishable from a product of the same final composition formulated directly as a finished product.

While the invention has been illustrated and described in detail in the foregoing description and examples, this is to be considered illustrative and not restrictive. All modifications and equivalents of the elements of the disclosed invention that come within the spirit of the invention as defined by the following claims are contemplated and their protection is desired.

What is claimed is:

1. A pumpable liquid beverage concentrate for preparing a finished beverage product comprising:
   i) a single sweetener consisting essentially of fructose;
   ii) non-dairy creamer;
   iii) a combination of xanthan gum and tragacanth gum;
   iv) one or more flavorings; and
   v) water
wherein said xanthan gum and said tragacanth gum are provided at a ratio of between about 1:1 and 2:1 xanthan gum to tragacanth gum; and
wherein said concentrate has a water activity at room temperature of less than or equal to about 0.83.

2. The concentrate of claim 1 wherein the concentrate is formulated to be used with between about three and about six volumes of water to prepare a predetermined finished beverage product.

3. The concentrate of claim 1 wherein the concentration of fructose is at least 25% by weight, the concentration of non-dairy creamer is at least 20% by weight and the combined concentration of xanthan gum and tragacanth gum is between about 0.075% and about 0.3% by weight.

4. The concentrate of claim 1 wherein the concentration of fructose is between about 25% and about 45% by weight, the concentration of non-dairy creamer is between about 20% and about 45% by weight, the concentration of xanthan gum is between about 0.02% and about 0.28% by weight, and the concentration of tragacanth gum is between about 0.02% and about 0.28% by weight, and wherein the combined concentration of gums is between about 0.075% and about 0.3% by weight.

5. The concentrate of claim 4 wherein the concentration of fructose is between about 30% and about 40% by weight and the concentration of non-dairy creamer is between about 25% and about 40% by weight.

6. The concentrate of claim 5 wherein the concentration of fructose is between about 33% and about 38% by weight and the concentration of non-dairy creamer is between about 28% and about 35% by weight.

7. The concentrate of claim 1 wherein the one or more flavorings are natural or artificial flavorings and wherein at least one flavoring is selected from the group consisting of coffee, cappuccino, tea, cocoa and chocolate.

8. A liquid beverage concentrate effective for mixing with water or carbonated water in a ratio of between about 1:3 and about 1:6, concentrate to water, to provide a liquid beverage: said concentrate consisting essentially of:
   i) fructose;
   ii) non-dairy creamer;
   iii) a combination of xanthan gum and tragacanth gum;
   iv) one or more flavorings; and
   v) water;
wherein said xanthan gum and said tragacanth gum are provided at a ratio of between about 1:1 and 2:1 xanthan gum to tragacanth gum; and
wherein said concentrate has a water activity at room temperature of less than or equal to about 0.83.

9. The liquid beverage concentrate of claim 8 wherein the concentration of fructose is between about 25% and about 45% by weight, the concentration of non-dairy creamer is between about 20% and about 45% by weight, the concentration of xanthan gum is between about 0.02% and about 0.28% by weight, and the concentration of tragacanth gum is between about 0.02% and about 0.28% by weight, and wherein the combined concentration of gums is between about 0.075% and about 0.3% by weight.

10. The liquid beverage concentrate of claim 9 wherein the concentration of fructose is between about 30% and about 40% by weight and the concentration of non-dairy creamer is between about 25% and about 40% by weight.

11. The liquid beverage concentrate of claim 10 wherein the concentration of fructose is between about 33% and about 38% by weight and the concentration of nondairy creamer is between about 28% and about 35% by weight.

* * * * *